United States Patent [19]

Mettler

[11] 4,361,777
[45] Nov. 30, 1982

[54] PIEZOELECTRIC TRANSDUCER FOR PRODUCING A SIGNAL DEPENDING ON THE TENSILE FORCE OF A TEXTILE THREAD

[75] Inventor: Hermann Mettler, Küssnacht, Switzerland

[73] Assignee: Fr. Mettler's Söhne Maschinenfabrik, Arth, Switzerland

[21] Appl. No.: 184,540

[22] Filed: Sep. 5, 1980

[30] Foreign Application Priority Data

Sep. 14, 1979 [CH] Switzerland .......................... 331/79

[51] Int. Cl.³ ............................................. H01L 41/02
[52] U.S. Cl. .................. 310/330; 200/61.18; 310/322; 310/323
[58] Field of Search .................. 226/11; 242/36, 37 R; 28/187; 57/78, 79, 80, 81; 66/161, 163; 200/61.13, 61.18; 310/330, 331, 332, 322, 323, 326

[56] References Cited

U.S. PATENT DOCUMENTS 3,108,161 10/1963 Tourtellot ........................... 310/330
3,298,401 1/1967 Stutz ................................. 200/61.18
3,916,687 11/1975 Loepfe et al. ......................... 28/187
4,110,654 8/1978 Paul ................................... 310/323

Primary Examiner—J. D. Miller
Assistant Examiner—D. L. Rebsch
Attorney, Agent, or Firm—Werner W. Kleeman

[57] ABSTRACT

A piezoelectric element forms at least a part of a resilient vibrator which is firmly gripped at one end at a clamping point and is stressed by the tensile force of the thread at the other end, and which is prestressed substantially parallel to the stressing direction through a bearing surface acting at a point between its ends and rigidly connected to the clamping point. As a result, the piezoelectric element detects vibrations which are transmitted to the vibrator from its clamping point far less than vibrations which are transmitted to the vibrator through its free end by the tensile force of the thread. The transducer is therefore particularly suitable for installation in or on thread-processing textile machines. Its signal indicates not only the presence but also—with a moving thread—the travel of the thread, particularly when this thread is withdrawn overhead from a bobbin.

10 Claims, 5 Drawing Figures

PIEZOELECTRIC TRANSDUCER FOR PRODUCING A SIGNAL DEPENDING ON THE TENSILE FORCE OF A TEXTILE THREAD

BACKGROUND OF THE INVENTION

The invention relates to a yarn travel monitoring device containing a piezoelectric transducer for producing a signal depending on the tensile force of a textile thread.

Apart from the known transducers working with strain gauges or capacitively, and delivering a signal depending on the tensile force of the thread, piezoresistive transducers are also known which, although they are distinguished by a high sensitivity and accuracy, nevertheless are only suitable for use in laboratory research installations and not for installation in or on machines processing threads. This is because the inevitable vibrations and natural oscillation of such machines are also detected by the piezoelectric element of the transducer and are thus superimposed as spurious signals on the signal depending on the tensile force of the thread.

In itself, a piezoelectric transducer would, because among other things of its low sensitivity to dirt and its mechanical robustness, be eminently suitable to be installed in or on machines processing threads, but hitherto the above-mentioned disadvantageous properties stood in the way of this kind of use.

SUMMARY OF THE INVENTION

It is therefore an object of the invention to provide a yarn travel monitoring device containing a piezoelectric transducer which is suitable for installation in or on textile machines processing threads.

For this purpose, the invention is based on the problem of constructing the transducer so that its piezoelectric element scarcely responds in practice to natural vibrations at the place where the transducer is installed, buy only to the stressing originating from the tensile force of the thread.

The present invention is directed to a yarn travel monitoring device containing a piezoelectric transducer for producing a signal depending on the tensile force of a textile thread, comprising a piezoelectric element forming at least a part of a resilient vibrator which is secured at one end at a clamping point and stressed by the tensile force of the thread at the other end, said vibrator being prestressed substantially parallel to the stressing direction through a bearing surface which acts at a point between the ends of the vibrator and is rigidly connected to the clamping point.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENTS

Figure 1:
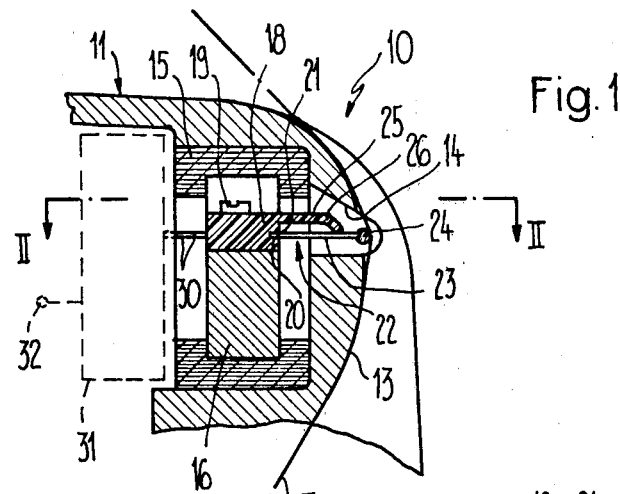
FIG. 1 shows a diagrammatic section on the line I—I of FIG. 2, through the essential components of a piezoelectric transducer.
Figure 2:
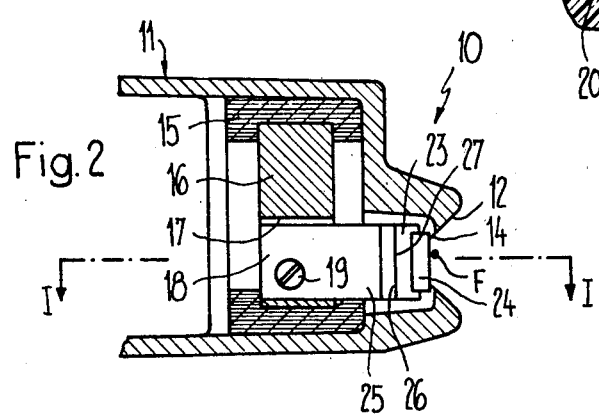
FIG. 2 shows a section on the line II—II of FIG. 1.

The yarn travel monitoring device containing a piezoelectric transducer 10 illustrated in FIGS. 1 and 2 comprises a housing 11 which may, for example, be integral with the housing of a thread-processing textile machine, for example a rewinding machine, a doubling winder or the like. Constructed at the outside of the housing is a channel 12 which is substantially V-shaped in cross-section and which serves to receive and guide a thread F and the bottom 13 of which is convex to the outside seen in the longitudinal direction of the channel 12. The bottom 13 is interrupted by a passage 14 which extends transversely to the channel 12 and which leads into the interior of the housing 11. Here a resilient socket 15, for example of foam plastics, is inserted which in turn surrounds a metal, substantially parallelepiped composition body 16. Machined in the body 16 is a groove 17 which serves to receive a clamping block or body 18 which in turn is firmly anchored on the composition body by means of a screw 19, for example.

Machined in this clamping block 18, substantially at the height of the passage 14, is a slit 20 in which the one end 21 of a resilient vibrator, generally designated by the reference numeral 22, is firmly gripped, for example pressed in and stuck. In the present case, the vibrator 22 consists essentially of a piezoceramic, rectangular small plate 23 which carries a bead-shaped thread guide 24 at its side opposite the firmly gripped end 21.

The components 16, 18 and 22 are disposed in the housing 11 (see FIG. 1), so that the thread guide 24 extends with clearance through the passage 14, and does so to such an extent that it penetrates through the arc described by the bottom 13 of the channel 12 and bridges the whole width of the bottom. Thus the thread F must brush the thread guide 24, that is to say this thread guide is exposed to a force depending on the tensile force of the thread, which thus stresses the vibrator 22 at its free end.

Originating from the clamping block 18 is an arm 25 which is made integral with this clamping block and which engages over the plate 23 and the free end of which is bent round in the direction of the plate 23 and is constructed in the form of a bearing surface or bearing surface element 26 which prestresses the plate 23 about a bending axis parallel to the thread guide 24, in the present case downwards. The bearing surface or bearing surface element 26 rests on a line 27 (FIG. 2) bridging the whole width of the plate 23. This line 27 is about twice as far away from the clamping slit 20 as from the thread guide 24. From this it follows that the free vibration length of the vibrator 22 for oscillations excited by the clamping block or body 18 (and hence by the point of installation of the transducer 10) is only determined by that section of the plate 23 which extends between the line 27 and the thread guide 24, while for oscillations excited by the thread guide 24, the whole length of the plate 23 is available between slit 20 and thread guide 24, but with a nodal point at the line 27.

Figure 3:
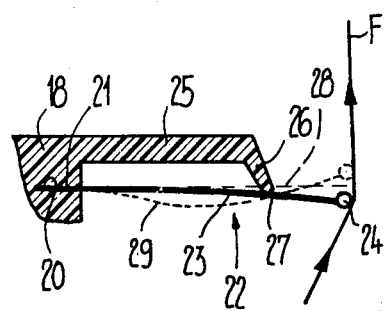
FIG. 3 shows, greatly enlarged and illustrated diagrammatically, a side view of essential parts of the transducer of FIG. 1.

These circumstances are seen more clearly from the greatly enlarged illustration represented diagrammatically in FIG. 3. FIG. 3 shows the clamping block 18 in the slit 20 of which the one end 21 of the small plate 23 (here only represented as a thick line) is gripped. Also seen is the arm 25 with the bearing surface 26 formed thereon. The broken line 28 indicates the direction which the plane plate 23 would adopt without the bearing surface 26. The purpose of the bearing surface 26, however, is to subject the plate to a preliminary bending stress so that this is bent somewhat downwards, as illustrated. In reality, the extent by which the plate is bent only amounts to a few hundredths of a mm. If the thread F is pulled over the thread guide 24 in the direction of the arrows of FIG. 3 with a certain tensile force, a frictional force results which acts on the thread guide 24 and is dependent on the tensile force of the thread and which has the tendency to bend the plate 23 more or less into the position indicated by the dotted line 29, so that the region of the plate between the line 27 and the slit 20 is also subjected to bending stress. On the other hand, if the block or body 18 and hence also the arm 25 and the bearing surface 26 experience vibrations (despite the socket 15), then the slit 20 and the bearing surface 26 move in synchronism and in phase so that only the short region of the plate 23 between the line 27 and the thread guide 24 can be excited to vibrate. By suitable selection of the length of this region, the natural frequency for this region can be selected so high that excitation by vibration from the block 18 can be ignored.

As with every piezoelectric element, electrical conductors 30 (only indicated diagrammatically in FIG. 1) lead from the plate 23 to a circuit 31 which is suitable for processing the voltage signals originating from the piezoelectric element and delivers a signal suitable for further evaluation at its output terminal 32.

Figure 4:
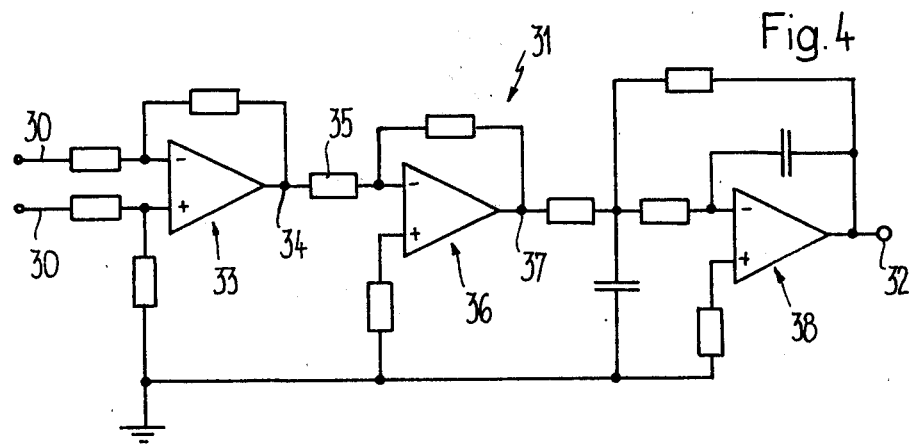
FIG. 4 shows a circuit, suitable for use with the transducer of FIG. 1, if the thread detected by the transducer is a travelling thread withdrawn overhead from a bobbin.

Such a circuit 31 is illustrated by way of example in FIG. 4. The conductors 30 lead to a first operational amplifier 33, the output 34 of which is connected, through a coupling resistor 35, to a second operational amplifier 36 with compensation for the effect of the input quiescent current. The output 37 of this operational amplifier is followed by a low-pass filter, in the present case an active Tschbyscheff low-pass filter 38.

Figure 5:
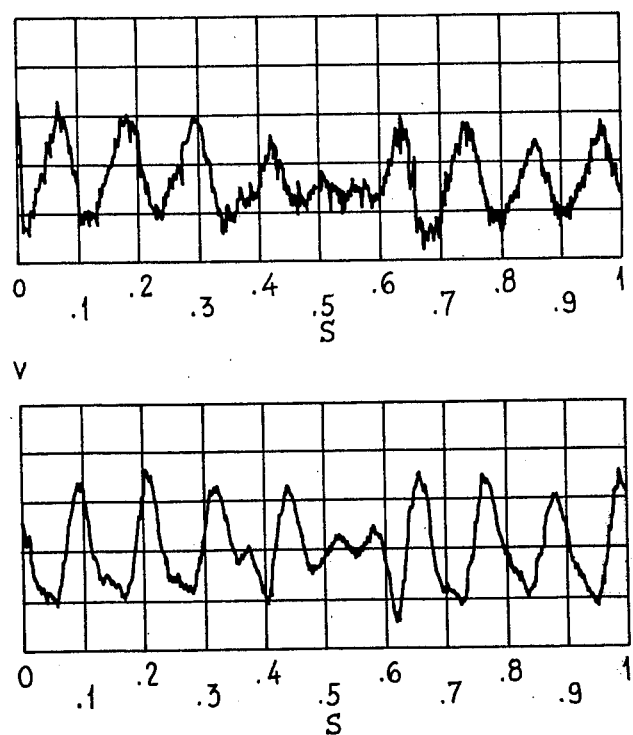
FIG. 5 shows the variation, in time, of a signal representing the tensile force of the thread, on the top as picked up by a conventional transducer for laboratory use, below simultaneously with a transducer as shown in FIG. 1 and with the circuit as shown in FIG. 4.

The circuit 31 is particularly suitable if the transducer is used to detect the tensile force of a thread withdrawn overhead from a bobbin. In this case, the course of the tensile force of the thread in time is known to be periodic with a period duration which corresponds precisely to a rise and fall of the thread detachment point at the bobbin. Now these periods can be counted and conclusions can be drawn from the result of the counting operation regarding the length of the thread which has been pulled past the transducer. The frequency with which the thread withdrawal force alters naturally depends on the speed of withdrawal and with normal withdrawal speeds has a value between about 10 and 20 Hz. Now the low-pass filter 38 is adjusted to such an upper limiting frequency that the signal components of higher frequency, likewise detected by the transducer 10, which originate, for example, from the roughness of the thread F and appear clearly superimposed as the fundamental frequency at the top in FIG. 5, are filtered out by the low-pass filter 38 so that a signal corresponding to FIG. 5, at the bottom portion thereof results at its output 32.

It has already been mentioned that, for example, the length of the thread withdrawn can be derived from this signal. This signal can also be used, however, to regulate a thread brake associated with the transducer, or in general to monitor not only the presence of the thread at the transducer 10 but also the travel of the thread through the transducer.

In the example described, a resilient flexural vibrator is provided as a vibrator. It is to be understood, however, that the principle of the invention can also be realized with a resilient torsional vibrator.

While there are shown and described present preferred embodiments of the invention, it is to be distinctly understood that the invention is not limited thereto, but may be otherwise variously embodied and practiced within the scope of the following claims. Accordingly,

What I claim is:

1. A yarn travel monitoring device comprising a piezoelectric transducer for producing a signal depending on the tensile force of a textile yarn, said transducer comprising a piezoelectric element forming at least a part of a resilient vibrator having two ends, a clamping body, one of said ends being fixedly secured to said clamping body, said vibrator being subject to a bending stress by the yarn contacting said vibrator in the range of said other end, said piezoelectric element being further prestressed substantially parallel to the bending stress originating from the travelling yarn by means of a bearing surface element acting upon said resilient vibrator at a point between its two ends, and said bearing surface element being rigidly connected to said clamping body.

2. The device as claimed in claim 1, in which the vibrator is subjected to bending prestressing by the bearing surface element in a direction counter to the bending stress induced by the tensile force of the thread.

3. The device as claimed in claim 2, in which the vibrator comprises a piezoceramic, substantially rectangular small plate which is clamped at the clamping point at one end and carries a thread deflecting member at its opposite end and is subjected to bending stress about bending axes parallel to its plane both by the tensile force of the thread and by the bearing surface element.

4. A yarn travel monitoring device for producing a signal depending on the tensile force of a textile thread, comprising a piezoelectric element forming at least a part of a resilient vibrator which is secured at one end at a clamping point and stressed by the tensile force of the thread at the other end, said vibrator being prestressed substantially parallel to the stressing direction through a bearing surface which acts at a point between the ends of the vibrator and is rigidly connected to the clamping point, said vibrator being subjected to bending stress by the tensile force of the thread, said vibrator being subjected to bending prestressing by the bearing surface in a direction counter to the bending stress induced by the tensile force of the thread, said vibrator comprising a piezoceramic, substantially rectangular small plate which is clamped at the clamping point at one end and carries a thread deflecting member at its opposite end and is subjected to bending stress about bending axes parallel to its plane both by the tensile force of the thread and by the bearing surface, the bearing surface being formed at the free end of an arm originating from a block comprising the clamping point, and the bearing surface resting on the plate along a line extending parallel to the thread deflecting member.

5. The device as claimed in claim 1, in which the bearing surface rests on the plate over the whole width of the plate.

6. The device as claimed in claim 4, in which the clamped end of the plate is gripped in a slit formed in the block.

7. The device claimed in claim 4, in which the supporting line of the bearing surface is located closer to the thread deflecting member than to the clamping point.

8. The device as claimed in claim 4, in which the block and the arm are made integral with the bearing surface.

9. The device as claimed in claim 5, in which the arm and the bearing surface are made of plastics material and are anchored on a body constituted by said block which in turn is installed floating in a housing through an elastic damping member.

10. The device as claimed in claim 7, in which the distance of the supporting line from the thread deflecting member corresponds to between $\frac{1}{3}$rd and $\frac{1}{2}$ of the distance of the supporting line from the clamping point.

* * * * *